(12) United States Patent
Alegre et al.

(10) Patent No.: US 6,199,113 B1
(45) Date of Patent: *Mar. 6, 2001

(54) APPARATUS AND METHOD FOR PROVIDING TRUSTED NETWORK SECURITY

(75) Inventors: Alfred A. Alegre, Belmont; Rong Q. Sha, Milpitas; William R. Soley, Campbell, all of CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,480

(22) Filed: Apr. 15, 1998

(51) Int. Cl.[7] .................................................. G06F 13/00
(52) U.S. Cl. ...................... 709/229; 709/219; 709/223; 709/225; 709/227; 713/201
(58) Field of Search .................................... 709/202, 203, 709/217, 218, 219, 223, 224, 225, 227, 229, 249, 250, 313; 713/201, 202; 380/4, 21, 23, 25, 49

(56) References Cited

U.S. PATENT DOCUMENTS

| | | | |
|---|---|---|---|
| 5,202,921 | * | 4/1993 | Herzberg et al. ...................... 380/23 |
| 5,235,642 | | 8/1993 | Wobber et al. . |
| 5,345,506 | * | 9/1994 | Tsubakiyama et al. ............... 380/23 |
| 5,708,780 | * | 1/1998 | Levergood et al. .................. 709/229 |
| 5,724,425 | * | 3/1998 | Chang et al. ........................... 380/25 |
| 5,754,939 | * | 5/1998 | Herz et al. ............................ 455/4.2 |
| 5,787,173 | * | 7/1998 | Seheidt et al. ......................... 380/21 |
| 5,832,228 | * | 11/1998 | Holden et al. ....................... 709/225 |
| 5,872,847 | * | 2/1999 | Boyle et al. ........................... 380/25 |
| 6,032,184 | * | 2/2000 | Cogger et al. ....................... 709/223 |

FOREIGN PATENT DOCUMENTS

| | | |
|---|---|---|
| 0 398 492 A2 | 11/1990 | (EP) . |
| WO 96/42041 | 12/1996 | (WO) . |
| WO 98/07088 | 2/1998 | (WO) . |

* cited by examiner

*Primary Examiner*—Viet D. Vu
(74) *Attorney, Agent, or Firm*—Finnegan, Henderson, Farabow, Garrett & Dunner, L.L.P.

(57) ABSTRACT

A session key is established for accessing a trusted network from a browser. An authentication process receives identification information from a user at the browser, and authenticates the user by checking the identification information against an authentication database. If the authentication database authenticates the user, a session key is created and stored at the browser. If the user is authenticated, a user profile defining access rights for the user is also retrieved. The user is then presented with access options based on the access rights defined in the user profile. In response to a user selection from the access page, the browser forwards an information request to the trusted network. The request includes a session key. A speaker object processes the information request and session key to form a network request packet. The network request packet is formed in a manner that allows authentication of the speaker object. The session packet is forwarded to a trusted network and processed. The packet is first authenticated to determine if it originated from the speaker object, and then the key is checked for validity at the trusted server. If the key is valid, the information request is processed and the information is returned to the user for display on the browser.

36 Claims, 14 Drawing Sheets

APPARATUS AND METHOD FOR PROVIDING TRUSTED NETWORK SECURITY

I. BACKGROUND OF THE INVENTION

A. Field of the Invention

The present invention relates generally to network security, and in particular to apparatus and methods for authenticating a user for allowing access to resources on a trusted network.

B. Description of the Prior Art

Trusted networks provide security limit access to network resources by controlling information passing to, from, and between the resources. For example, information transfer may be controlled by user identification and authentication, access security levels, and physical measures.

Protecting data residing in a company's trusted network is paramount. The most difficult security situations arise when the public is given access to the trusted network, such as through the Internet. Web servers residing between the trusted network and the Internet provide access to databases or legacy applications residing within the trusted network, and may provide unauthorized access to the trusted network from the Internet. Several techniques have been used to make trusted networks more secure from unauthorized access.

Firewalls are one of the most common forms of security. A firewall is a system or structure that limits outside access to a trusted network by limiting the path through which information may flow. For example, whenever the outside web server needs access to the trusted network, the web server submits a request through a firewall port. The port only allows certain protocols, such as HTML, to a specific machine on the trusted network. Firewalls alone are not adequate, however, because they control access based on the location of the user, rather than the identity of the user.

Middleware is also frequently used. Middleware replaces general protocols, such as HTML and SQL, with application-specific protocols. For example, an application issues a request for services in an application-specific form to the middleware residing in the trusted network. The middleware then receives the request and translates it to a general protocol understood by the server. Intruders, however, can monitor communications between the outside web server and trusted network server, and eventually identify the protocol and patterns of the packets being handled by the middleware. Based on the protocol and patterns, an intruder can access the network to request a service.

To prevent an intruder from monitoring communications, encryption can be incorporated into the architecture. Although effective, encryption does not prevent an intruder from breaching security.

Because no security architecture is 100% secure, multiple security measures are often combined. One approach uses a sub-network that isolates databases from the trusted network. If an intruder gains access into the subnet, the worst that can happen is data residing within the subnet is compromised, but the rest of the trusted network remains secure. This scenario may be adequate in cases where there is no need to interface with other databases or legacy systems within the trusted network.

FIG. 1 is a block diagram showing a typical trusted network security system. The goal of the system is to ensure that resources on trusted network 138 are not improperly accessed by outside entities, such as client browser 110. Access to trusted network 138 is limited in several ways.

Firewall 118 is the first line of defense for providing security to trusted network 138. Firewall 118 may, for example, limit the types of protocol transferred from Internet 114 to DMZ network 122. Web host 126 processes URL requests from client browser 110, and forms a request that is sent over trusted network 138 to database server 142. The request is sent through firewall 130, which provides yet another line of defense. Firewall 130 may also limit the types of information sent by web host 126 to database server 142.

Database server 142 performs a further level of security by insuring that it only processes requests received from web host 126. When web host 126 makes a request, web host 126 also sends a web server identity code with the request. Database server 142 checks the identifier to authenticate that the request is from web host 126. If database server 142 determines that the request is from web host 126, database server 142 retrieves the requested information from database 134, and returns the information to web host 126. Web host 126 transmits the requested information to client browser 110 over DMZ network 122 and Internet 114.

Although firewalls 118 and 130, and authentication of web host 126 by database server 142 provide some security, it is still possible for an intruder to breach security and improperly access resources on the network, such as DB 134. The user at client browser 110 may repeatedly attempt various combinations of access to trusted network 138 until one is found that breaks through the system. Therefore, breaches of security are still possible even with two firewalls and the web server verification performed by database server 142. What is needed then is a higher level of security for trusted network 138 in order to allow access by users on the Internet in a controlled and secure manner.

II. SUMMARY OF THE INVENTION

The present invention relates to trusted networks, and in particular to a method and apparatus for raising security levels of the trusted network.

A system consistent with the present invention comprises a device for processing an original request and key from a requester to form a network request; a device for transferring the network request to a trusted network; a device for processing the network request to extract the key and original request if the request was processed by the device for processing a request and key; and a device for performing the original request if the key is valid.

A method consistent with the present invention comprises processing an original request and key from a requester to form a network request; transferring the network request to a trusted network; processing the network request to extract the key and original request if the request was processed in the step of processing an original request and key; and performing the original request if the key is valid.

Another system for providing access to a resource, consistent with the present invention, comprises a device for storing a key based on requester authentication; a device for forwarding the key to the requester; a device for receiving an original request and the key from the requester; a device for processing the original request and the key from the requester to form a network request; a device for transferring the network request to a trusted network; a device for processing the network request to extract the key if the network request was processed by the device for processing the original request and the key; and a device for performing the original request if the key is valid.

Another method for providing access to a resource, consistent with the present invention, comprises storing a key based on requester authentication; forwarding the key to the requester; receiving an original request and the key from the requester; processing the original request and the key from the requester to form a network request; transferring the network request to a trusted network; processing the network request to extract the key if the network request was processed by the device for processing the original request and the key; and performing the original request if the key is valid.

The invention overcomes the problems of conventional prior art systems described above. Additional advantages of the invention are apparent from the description which follows, and may be learned by practice of the invention. It is to be understood that both the foregoing general description and the following detailed description are exemplary and explanatory only and are not restrictive of the invention, as claimed.

The accompanying drawings, which are incorporated in and constitute a part of this specification, illustrate an embodiment of the invention and together with the description serve to explain the principles of the invention.

III. BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings, FIG. 1 is a block diagram showing a prior art trusted network security system;

IV. DETAILED DESCRIPTION OF THE PREFERRED EMBODIMENTS

Apparatus and methods consistent with the principles of the present invention create a session key that is stored at a client browser and used to access a trusted network. A session key is created the first time a user requests access to a resource on the trusted network. Subsequently, whenever the user accesses the trusted network during the session in which the session key is made, the session key is transmitted with the access request so that the trusted network can use the session key to authenticate the user.

Figure 1:
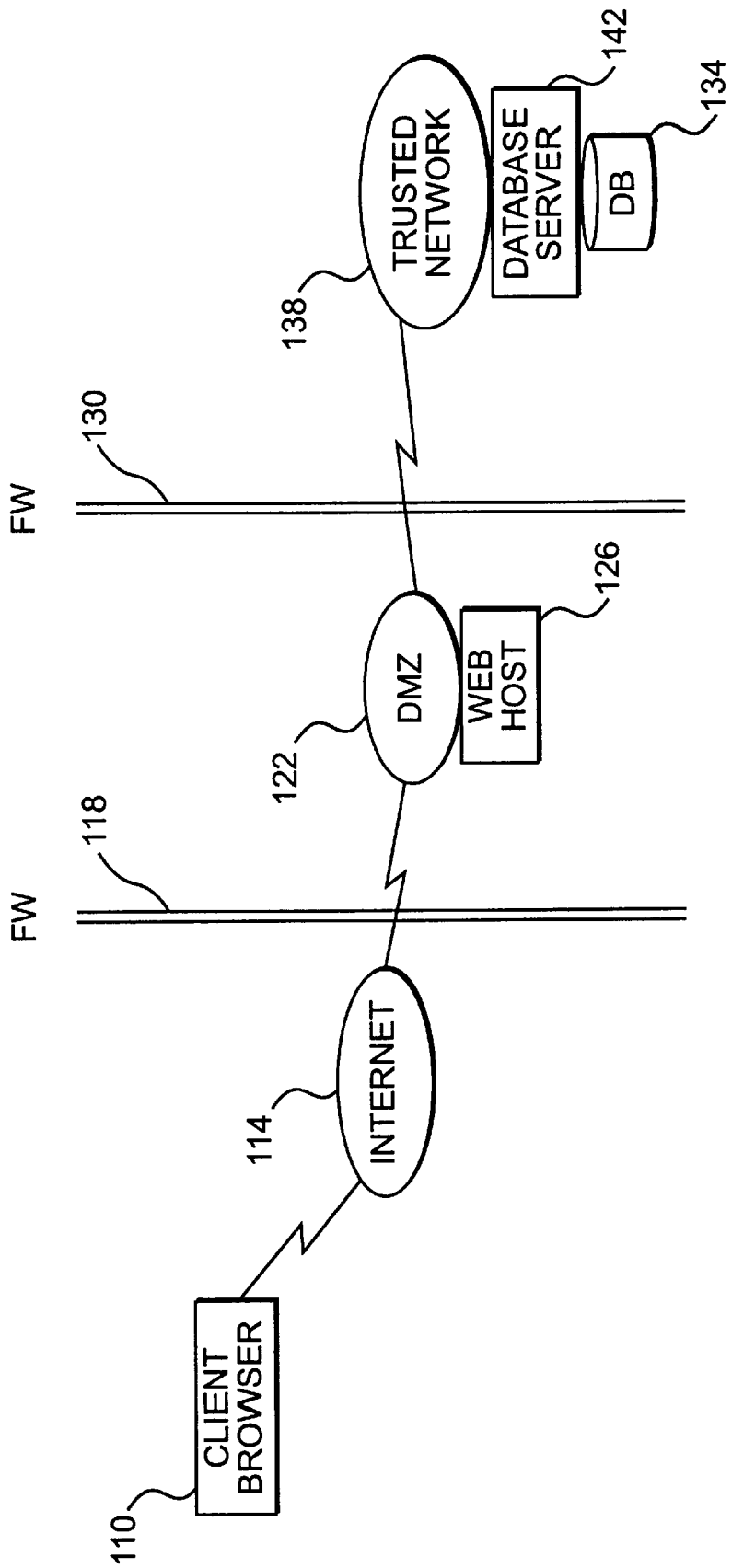
Figure 2:
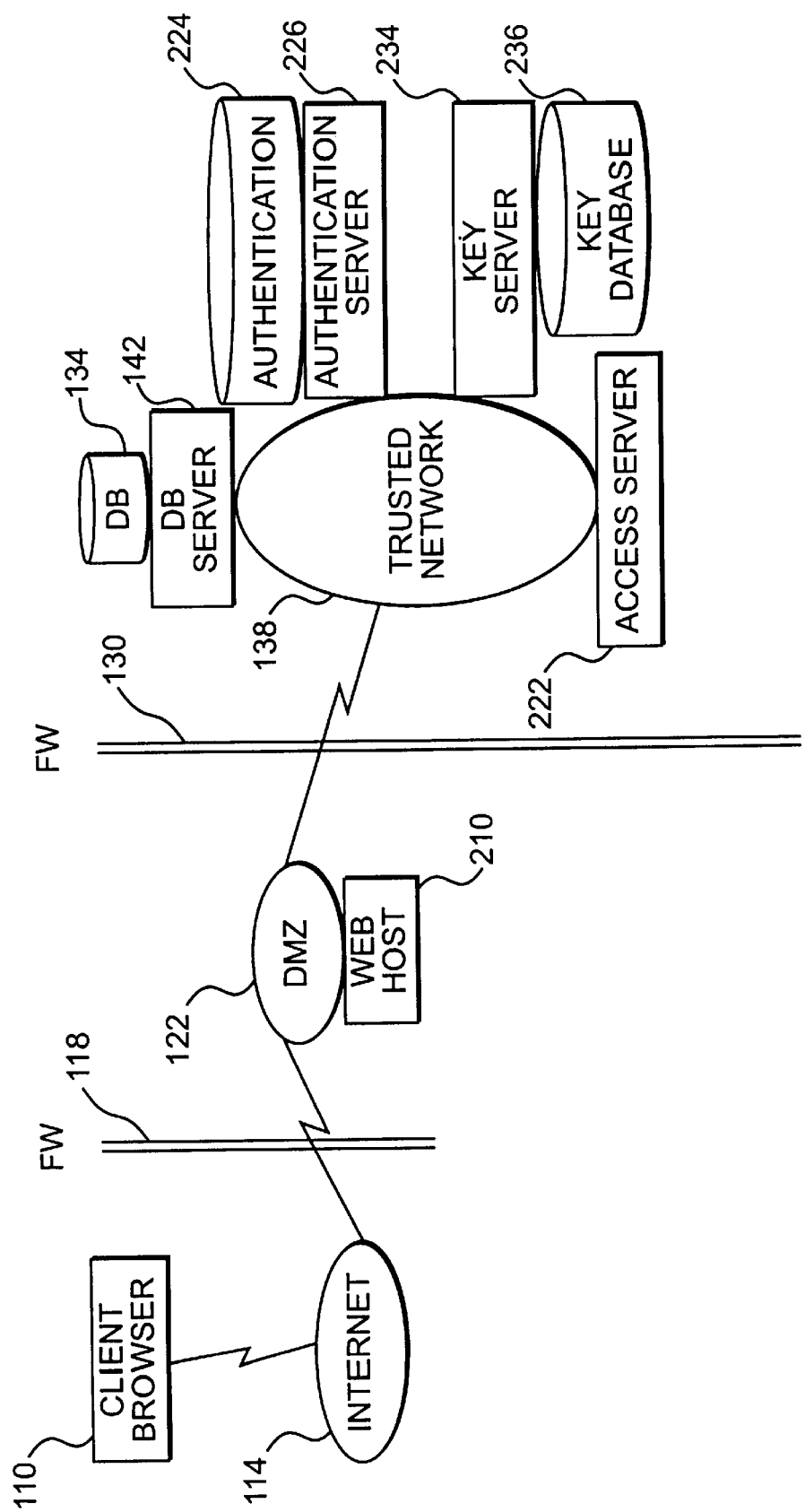
FIG. 2 is a block diagram showing an architecture consistent with the principles of the present invention.

FIG. 2 is a block diagram showing a network system consistent with the principles of the present invention. Client browser 110, Internet 114, firewall 118, DMZ network 122, firewall 130, DB 134, and trusted network 138 have been discussed with respect to FIG. 1. The system of FIG. 2 creates a session key for use in accessing trusted network 138. Creation of the session key will be discussed first, followed by use of the session key in accessing resources of the trusted network.

Creation of a session key is handled primarily by web host 210, authentication server 226 and key server 234. When the user wants to access trusted network 138, the user sends a request from client browser 110, over Internet 114 and DMZ network 122, to web host 210. If this is the first attempt to access trusted network 138, web host 210 must log in the user.

To log in the user, web host 210 requests user authentication information, such as a user ID (UID) and password (PWD), from the user at client browser 110. Upon receiving the UID and PWD, web host 210 requests authentication of the UID and PWD from authentication server 226. Identifying information other than a UID and PWD could also be used.

Authentication server 226 queries authentication database 224 to determine validity of the UID and PWD information. If the UID and PWD are valid, authentication server 226 receives a user access profile from authentication database 224. Authentication server 226 then requests a session key from key server 234. Key server 234 creates a unique and unpredictable session key, and stores the session key, the UID, the PWD, and key expiration criteria in key database 236. Authentication server 226 then transmits the session key and user access profile to web host 210. Web host 210 stores the session key at client browser 110 using a cookie.

Web host 210 also sends trusted network access presentation information to client browser 110. The trusted network access presentation information is created based on the user access profile, and thus includes only selections for accessing resources that the user has access to.

The user selects an access request from the trusted network access presentation information to access trusted network 138. Client browser 110 sends the request, for example a URL associated with the selection, and the session key to web host 210. Web host 210 processes the request and session key to create a network request packet, and transmits the packet to access server 222.

Access server 222 verifies that the network request packet came from web host 210, extracts the session key from the network request packet, and transfers the session key to key server 234 to determine whether it is valid. Key server 234 compares the session key with currently valid session keys to determine if the session key is still valid, and returns the results of the session key validity check to access server 222.

If the session key is still valid, access server 222 performs the request. For example, access server 222 may access DB 134, to obtain requested information from, or write requested information to DB 134. If the request is a read request, access server 222 transmits the requested information to web host 210.

By using a unique and unpredictable session key for each session from the client browser 110, the apparatus and methods consistent with the principles of the present invention provide a high level of security for accesses to trusted network 138. The elements of FIG. 2 will now be discussed in greater detail.

Session Key Creation

Figure 3:
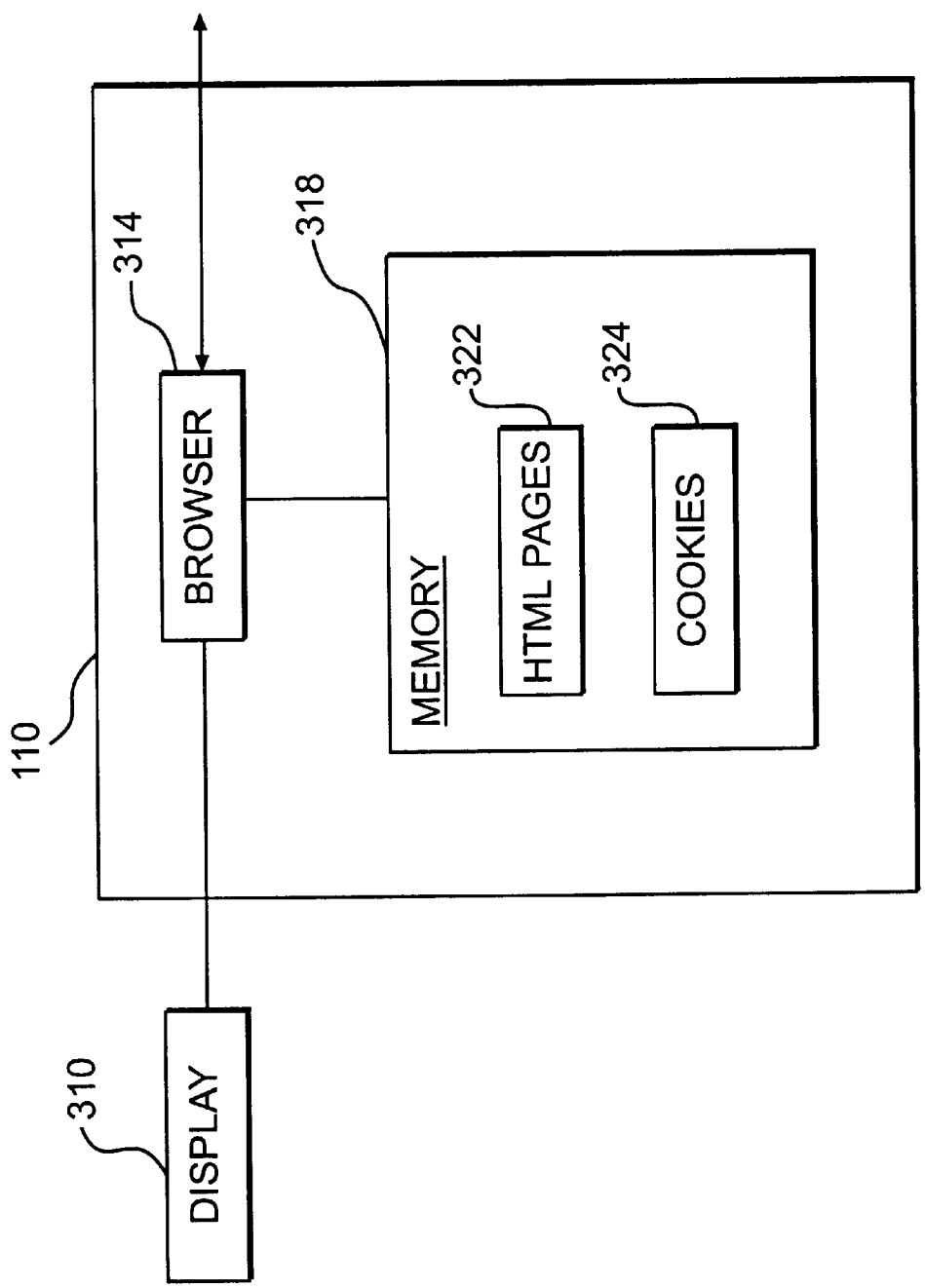
FIG. 3 is a block diagram of client browser 110.

FIG. 3 is a block diagram of client browser 110. Client browser 110 is a web browser that requests content, such as HTML pages, over Internet 114, receives the content, and stores the content in memory 318, shown in FIG. 3 as HTML pages 322. Browser 314 also displays the HTML pages on display 310 and stores cookies 324 received over Internet 114. "Cookies" are small files placed on a user's computer by a web site. The cookies allow the web site to maintain state information at client browser 110. For example, cookies allow the web site to collect information on how a user uses the web site. In the present invention, a cookie is used to store the session key at client browser 110 by web host 210.

Figure 4:
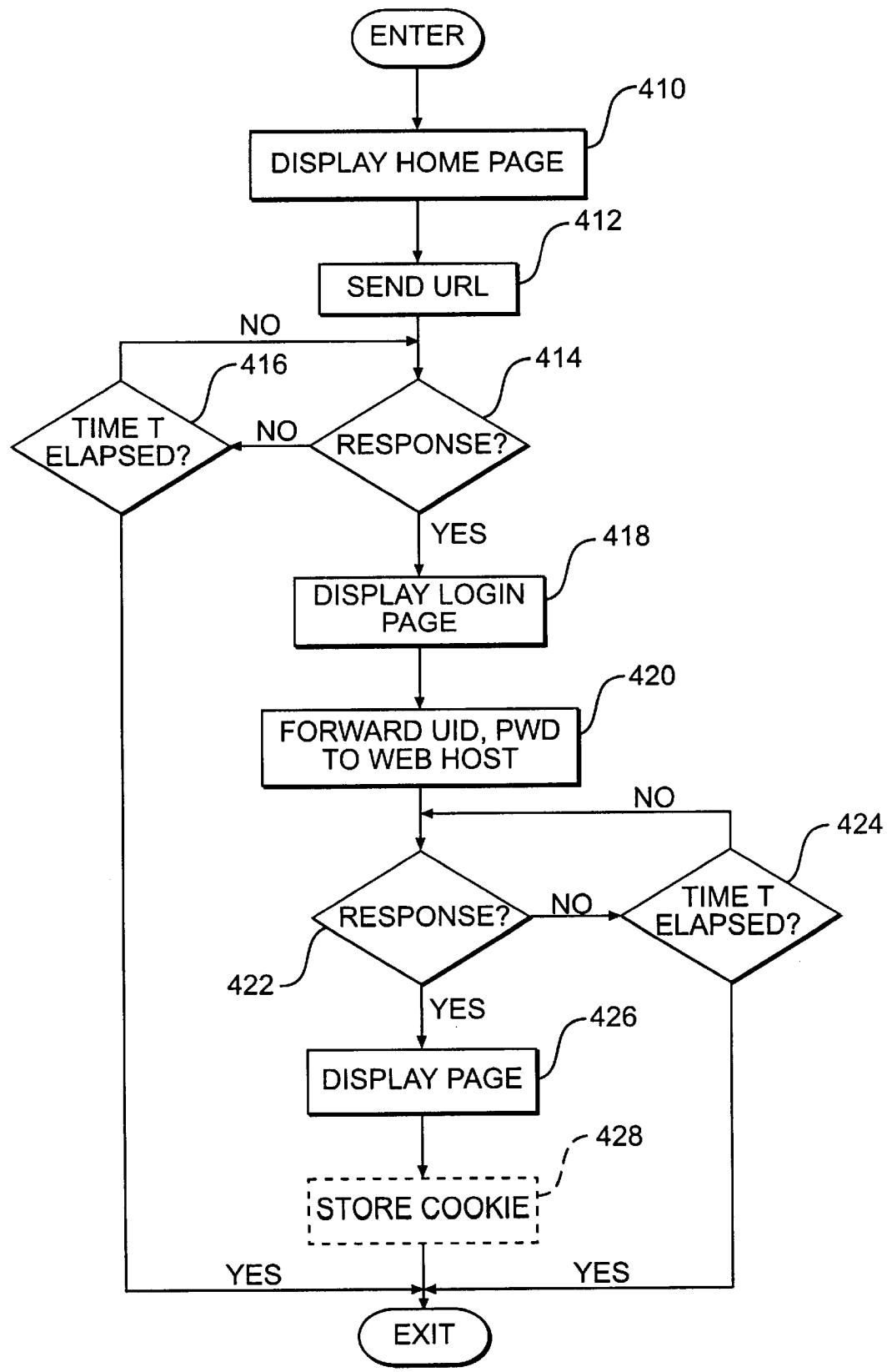
FIG. 4 is a flowchart showing the operation of client browser 110 when a user first attempts to access trusted network 138.

FIG. 4 is a flowchart showing the operation of client browser 110 the first time a user attempts to access trusted network 138. Browser 314 first displays the home page on display 310 (step 410). In response to a request from the user, browser 314 sends a request, such as a URL, over Internet 114 (step 412), and waits for a response (step 414) by entering a wait state for a period of time (step 416).

If the request is for trusted network 138, web host 210 receives the request and returns a login page to client browser 110 for display (step 418). The login page prompts the user for user authentication information, such as UID and PWD. Browser 314 receives the UID and PWD from the user and forwards the information over Internet 114 to web host 210 (step 420), and goes into a wait state (step 422) for a period of time (step 424). Web server forwards the UID and PWD to authentication server 226 for authentication.

Whether or not UID and PWD are authenticated, web host 210 returns trusted network access presentation information to client browser 110 for display (step 426). If the UID and PWD are not authenticated, the presentation information indicates that authentication was unsuccessful. If UID and PWD are authenticated, however, web host 210, sends trusted network access presentation information and a cookie with the session key and browser 314 stores the cookie (step 428). The trusted network access presentation information has a menu of selections for accessing resources on trusted network 138.

Figure 5:
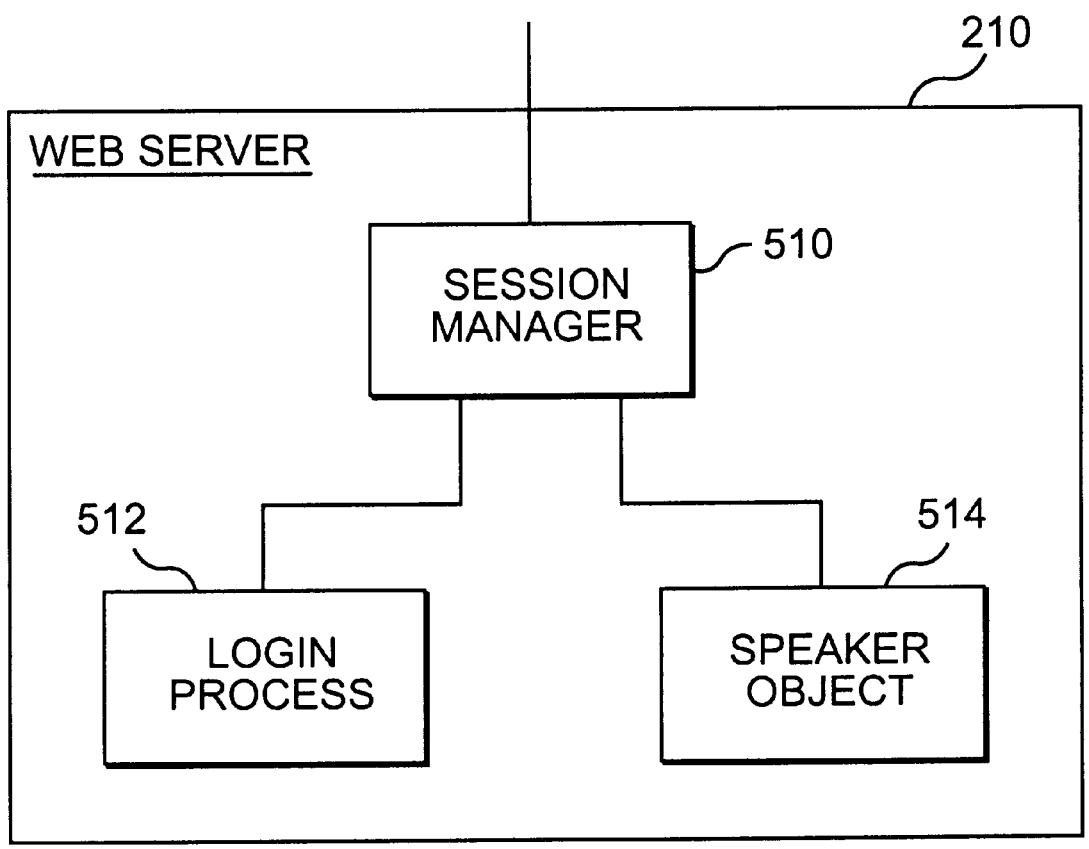
FIG. 5 is a block diagram showing web host 210 of FIG. 2.

FIG. 5 is a block diagram showing web host 210 of FIG. 2. Web host 210 is comprised of session manager 510, login process 512, and speaker object 514. Web host 210 may be implemented as a typical network server comprised of hardware and software. Session manager 510, login process 512, and speaker object 514 represent software modules running on the server. Session manager 510 is responsible for coordinating the operations of login process 512 and speaker object 514. Additionally, session manager 510 interfaces with DMZ network 122 for receiving information from and transmitting information to DMZ network 122.

Figure 6:
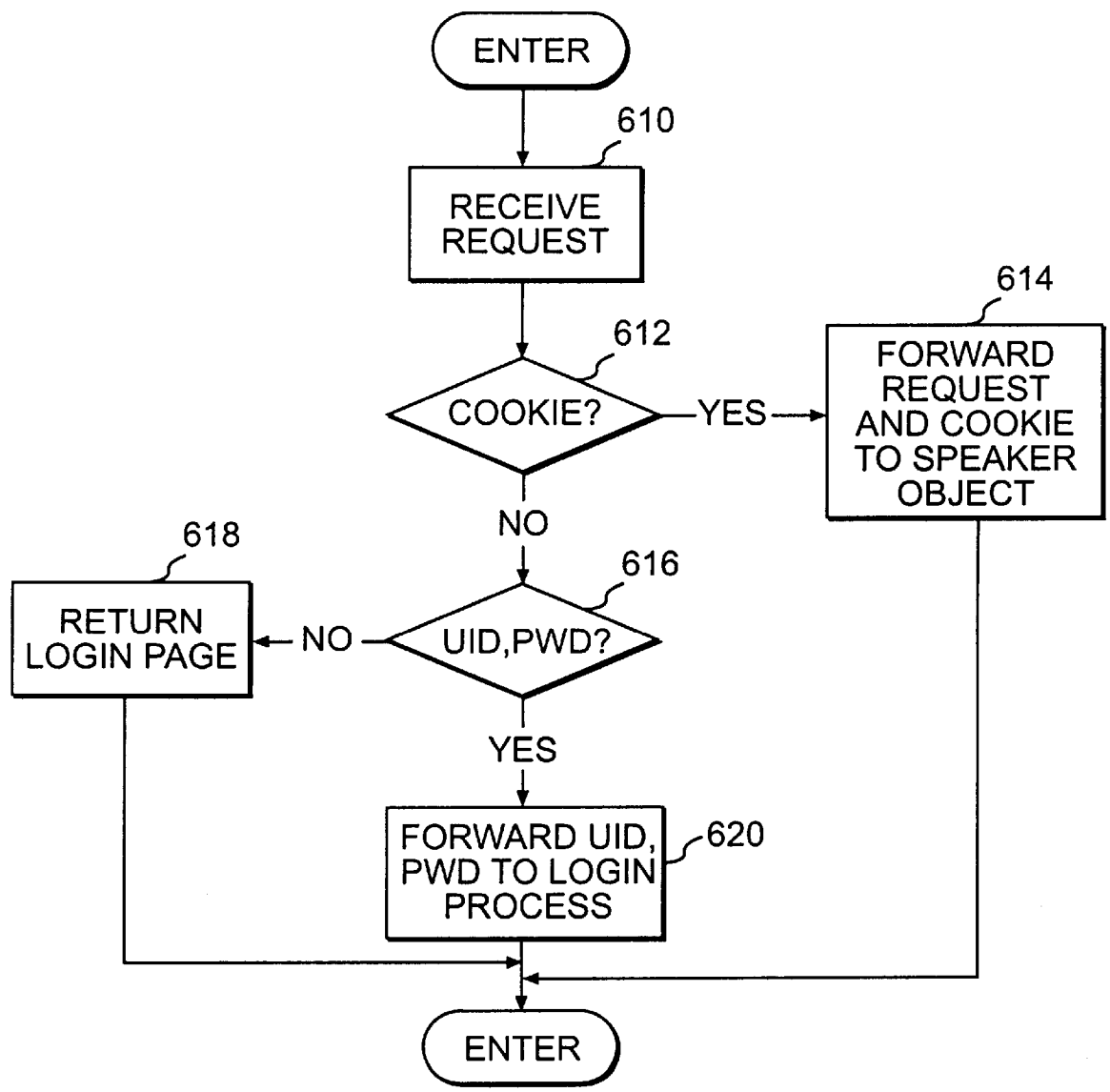
FIG. 6 is a flowchart showing the processing of web host 210 of FIG. 2.

FIG. 6 is a flowchart showing the processing of web host 210 of FIG. 2. Web host 210 first receives a request from client browser 110 (step 610). If the request contains a cookie (step 612: YES) the request is forwarded to speaker object 514 (step 614). If the request does not contain a cookie (step 612: NO) the request is checked for UID and PWD information (step 616).

If the UID and PWD information is present (step 616: YES) session manager 510 forwards the UID and PWD to login process 512 (step 620). If there is no UID and PWD information (step 616: NO), web server returns a login page to client browser 110 (step 618) to prompt the user for login information.

Figure 7:
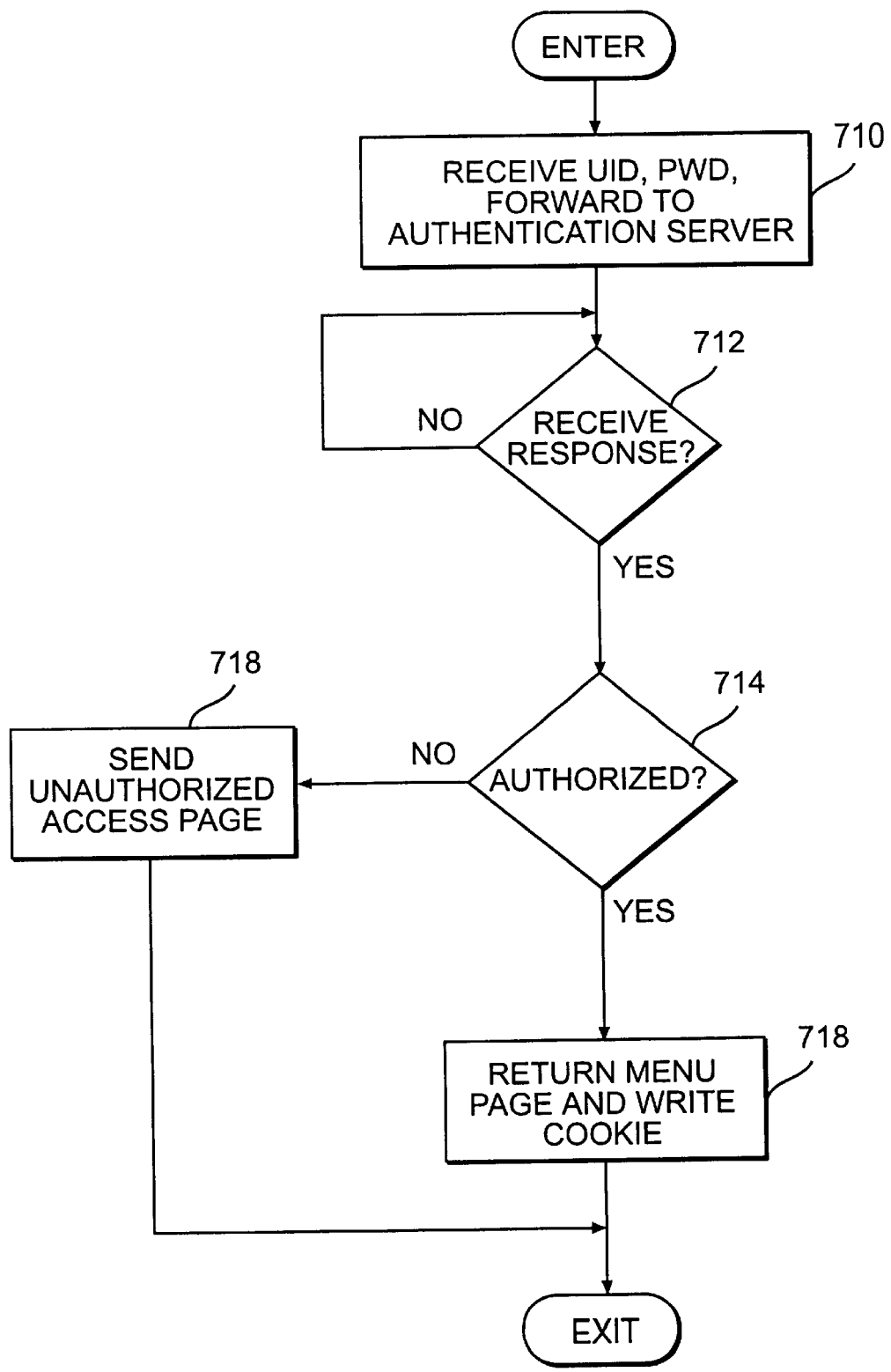
FIG. 7 is a flowchart showing the user authentication process performed by login process 512.

FIG. 7 is a flowchart showing the user authentication process performed by login process 512. Login process 512 first receives user authentication information, such as a UID and PWD, from client browser 110, and forwards the authentication information to authentication server 226 via session manager 510 (step 710), and enters a wait state (step 712) to wait for the results of the authentication process.

If authentication server 226 returns a negative authentication (step 714: NO), meaning that the UID and PWD were not authenticated, login process 512 causes session manager 510 to return an unauthorized access page to client browser 110 (step 716). If UID and PWD are authenticated (step 714: YES), login process 512 receives a session key and user profile from authentication server 226. Login process 512 creates a trusted network access menu page using the user profile and a cookie containing the session key, and forwards the page and cookie to client browser 110 (step 718).

Figure 8:
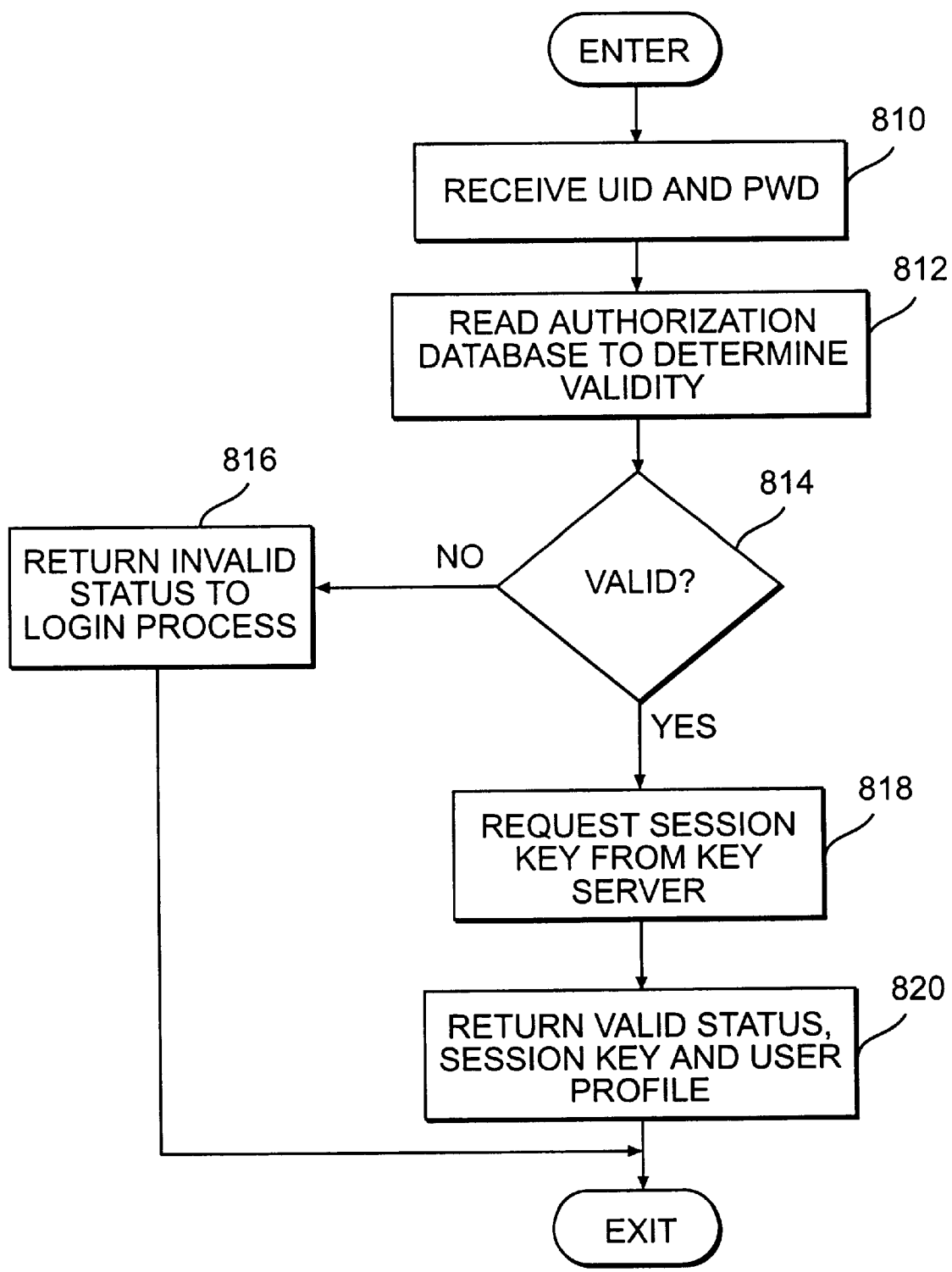
FIG. 8 is a flowchart showing processing performed by authentication server 226.

FIG. 8 is a flowchart showing the processing performed by authentication server 226. Authentication server 226 first receives the UID and PWD from login process 512 as part of the initial login by the user at client browser 110 (step 810). Authentication server 226 queries authentication database 224 to determine if the UID and PWD are valid (step 812). Authentication database 224 stores information defining which users may access resources on trusted network 138. Authentication database 224 also stores user profile information that defines the types of access each user has to the resources on trusted network 138. On the one hand, if the UID and PWD are not valid (step 814: NO), authentication server 226 returns an invalid status to login process 512 (step 816). On the other hand, if authentication server 226 receives an indication from authentication database 224 that UID and PWD are valid (step 814: YES), a session key is requested from key server 234 (step 818). Key server 234 creates a new key, stores it in key database 236 with the UID and PWD, and expiration criteria.

In addition to receiving a validation indication from authentication database 224, authentication server 226 also receives a user profile that specifies the user's access rights to trusted network 138. After receiving a new session key from key server 234, authentication server 226 returns an indication of the UID and PWD being valid, session key, and the user profile to login process 512 (step 820).

Figure 9:
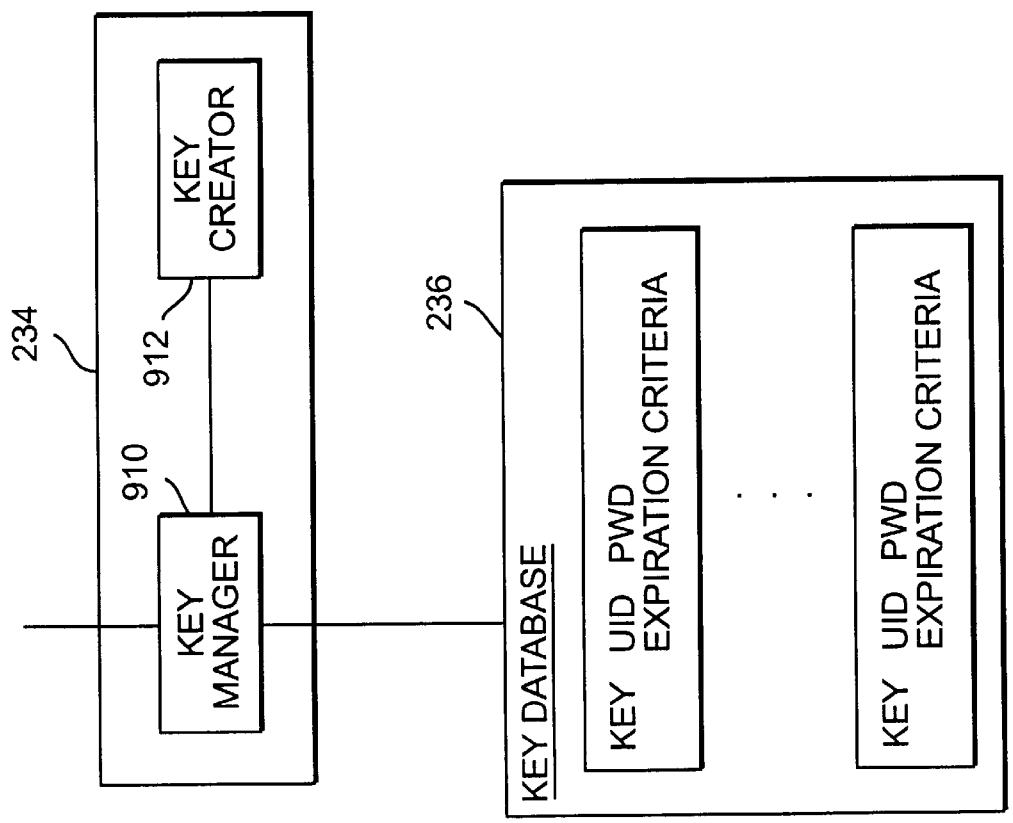
FIG. 9 is a block diagram showing in greater detail key server 234 and key database 236.

FIG. 9 is a block diagram showing key server 234 and key database 236. Key server may be implemented using a processor and memory. Key server 234 includes key manager 910 and key creator 912. Key manager 910 receives the session key request, along with the UID and PWD, from authentication server 226, and requests key creation by key creator 912. The session key must be unique, unpredictable, and from a sufficiently large number space so that it is infeasible to guess its value. For example, a 64-bit or larger random number encoded in Base64 may be used. Upon receiving the new session key from key creator 912, key manager 910 stores the session key, UID, and PWD, along with expiration criteria for the session key, in key database 236. Key manager 910, then transfers the new session key to authentication server 226 for transmission to login manager 214. Key manager 910 also monitors the expiration criteria, and deletes keys in accordance with the criteria, or when the user voluntarily logs out.

Use of Session Key

Figure 10:
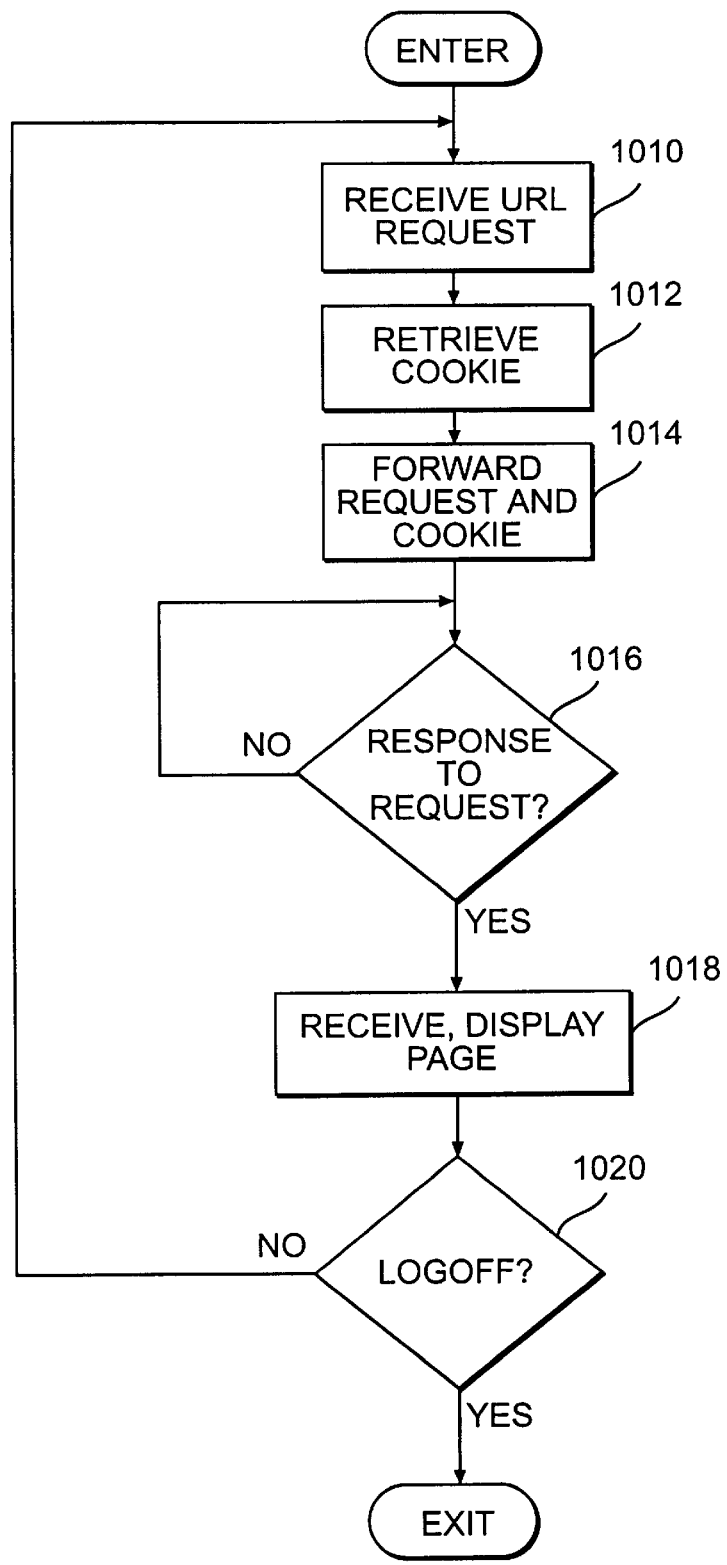
FIG. 10 is a flowchart showing the operation of client browser 110 when making an access request.

FIG. 10 is a flowchart showing the operation of client browser 110 accessing trusted network 138 after the session key has been stored in client browser 110. The user makes a selection from the trusted network access web page created by login process 512 using the user profile. Browser 314 receives the request (step 1010), and retrieves the cookie holding the session key (step 1012). Browser 314 then forwards the request and cookie to web host 210 (step 1014), and goes into a wait state to wait for the requested information from web host 210 (step 1016). When browser 314 receives the requested content, for example in the form of an HTML page, the content is displayed (step 1018). If the user does not log off (step 1020: NO) the process resumes with receiving another user request. If the user chooses to log off (step 1020: YES), the client browser forwards a logout request to the web host which instructs both the browser and the key server to delete the session key.

Figure 11:
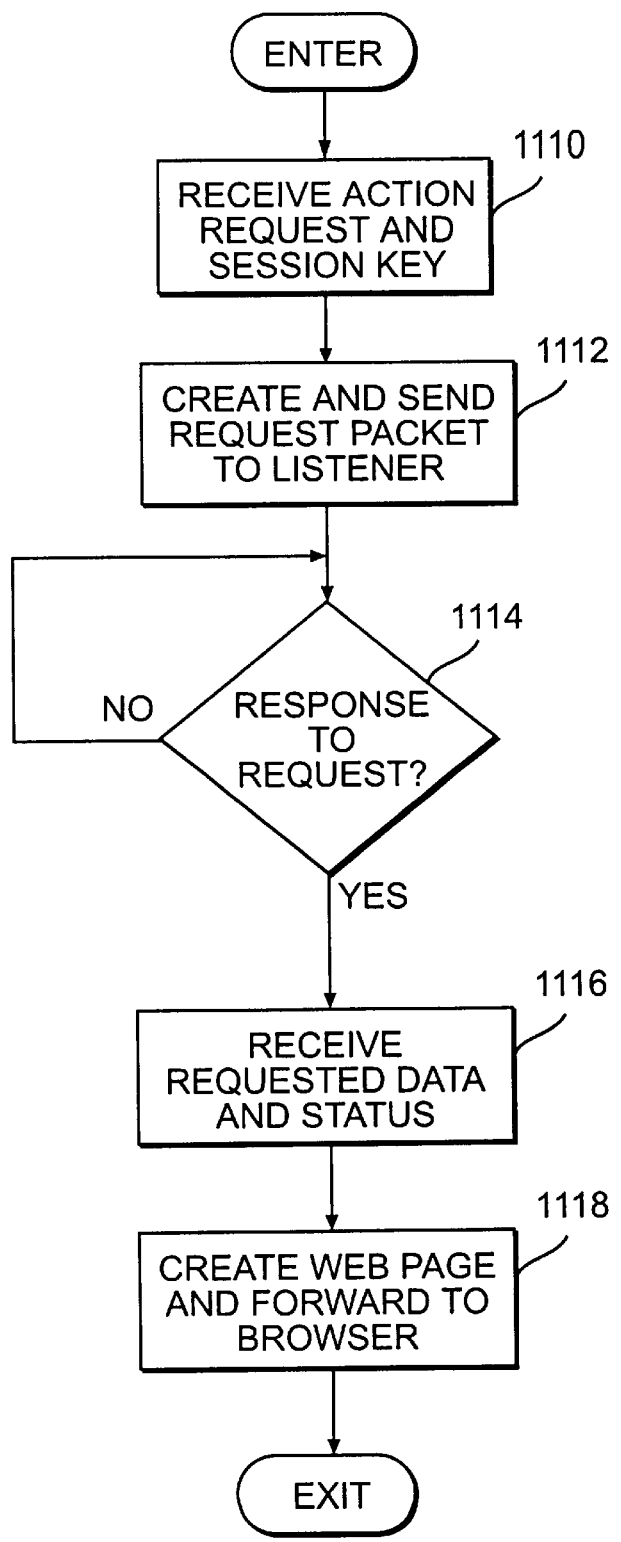
FIG. 11 is a flowchart showing the processing of user requests by speaker object.

FIG. 11 shows processing of user requests to access trusted network 138 by speaker object 514. Speaker object 514 first receives the action request and session key from client browser 110 (step 1110). In response, speaker object 514 creates a request packet that includes the action request and the session key, sends the packet to access server 222 (step 1112), and goes into a wait state (step 1114) until a response is received from access server 222.

The packet created by speaker object 514 may be created in a variety of ways. For example, the packet may be created by merely concatenating a web server identifier, speaker object identifier, or other identifier, to the session key and URL request received from the user. Alternatively, speaker object 514 may sign the packet by encrypting it with the private key. The private key could be pre-programmed at speaker object 514, or may be received from trusted network 138 (not shown). The packet is created in such a way that when listener object 230 receives the packet, the packet can be identified as originating from speaker object 514.

When speaker object 514 receives a response to the request from access server 222 (step 1116), speaker object 514 creates a web page based on the response, and sends the web page to session manager 510 for transmission to client browser 110 (step 1118).

Figure 12:
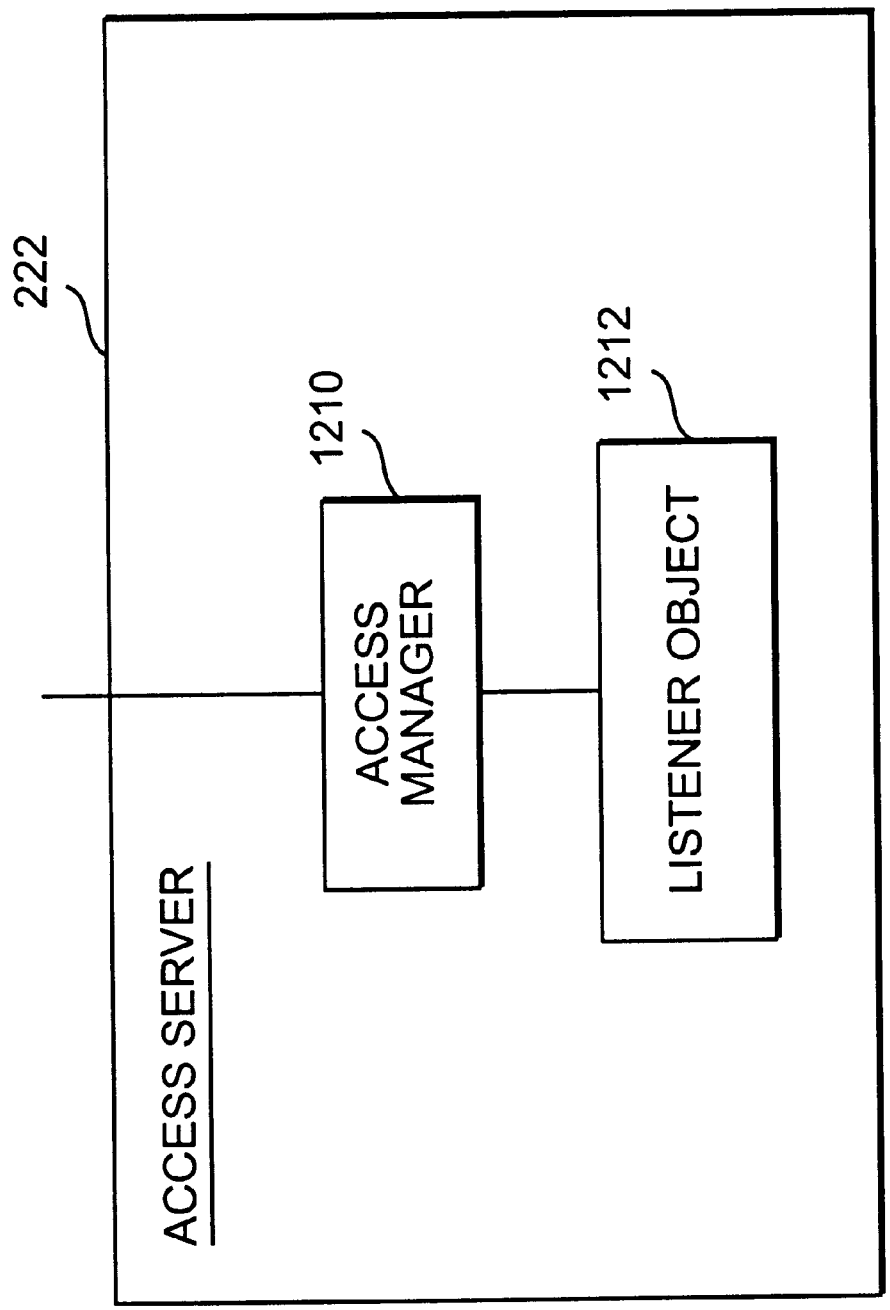
FIG. 12 is a block diagram of access server 222 of FIG. 2.

FIG. 12 is a block diagram showing access server 222 of FIG. 2. Access server 222 is comprised of access manager 1210 and listener object 1212. Access server may be implemented as a network server as is well understood in the art. For example, access server 222 may be implemented using a processor and memory. Access manager 1210 interfaces access server 222 with trusted network 138, and manages the operations performed by listener object 1212. Listener object 1212 is responsible for receiving network requests from speaker object 514, verifying the validity of the request, and performing the request if valid.

Figure 13:
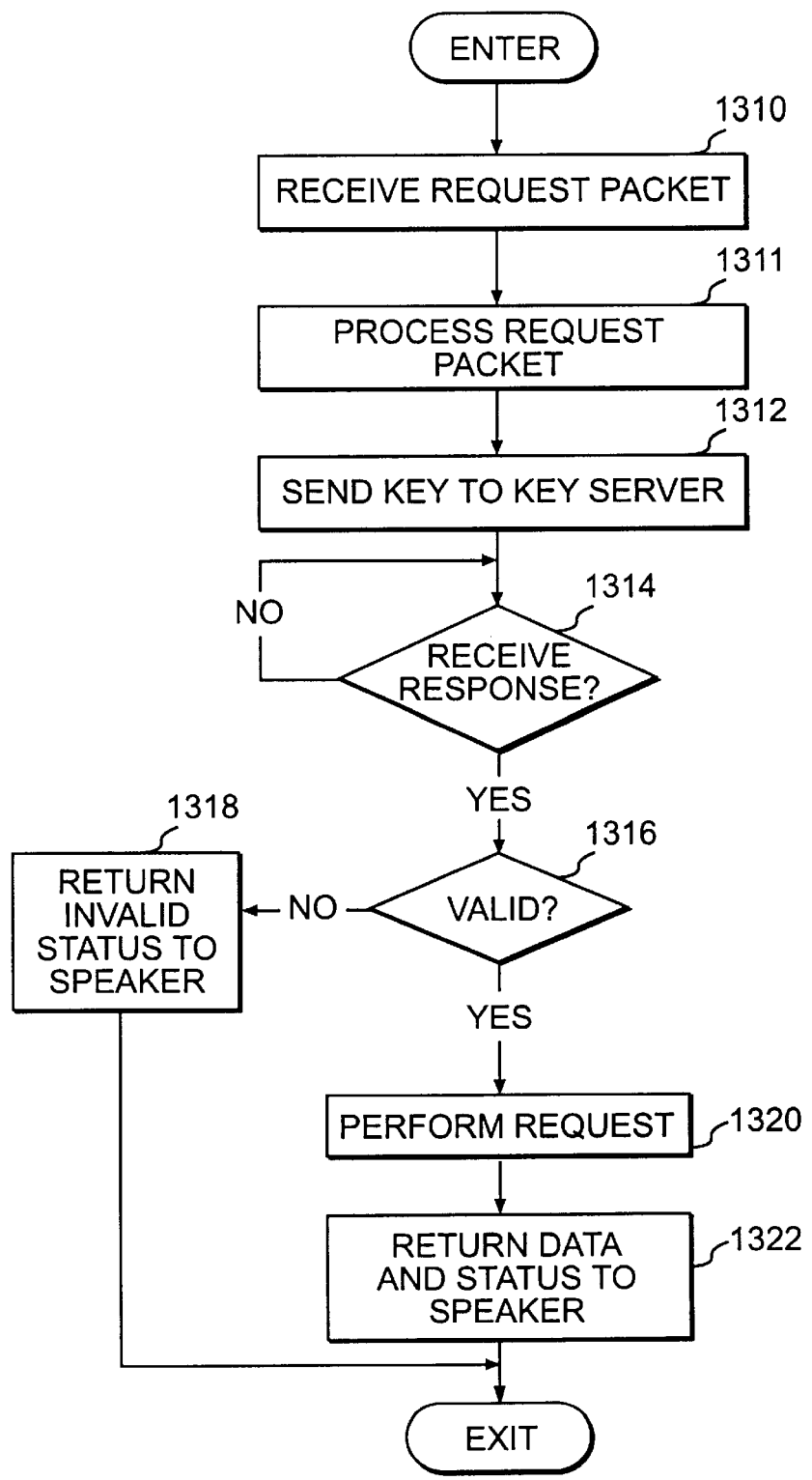
FIG. 13 is a flowchart showing the processing performed by listener object 1212 of FIG. 12.

FIG. 13 is a flowchart showing the processing performed by listener object 1212. Listener object 1212 first receives the network request packet containing the action request and session key from speaker object 514 (step 1310). For example, if speaker object 514 signed the packet using speaker identification information, listener object must verify the signature before extracting the action request and session key. If the packet is not from speaker object 514, the signature verification process by listener object 1212 fails and the key and request sent from speaker object 514 will be rejected by listener object 1212.

Alternatively, speaker object 514 and listener object 1212 may each have the same web server identification information. Speaker object 514 attaches the web server identification to the packet, which is verified by listener object 1212 upon receipt. Listener object 1212 processes the packet to extract the session key and network access request from the packet (step 1311), sends the key to key server 234 for validation (step 1312), and goes into a wait state step 1314 to wait for the validation of the session key (step 1314).

If key server 234 determines that the session key received from listener object 1212 is invalid (step 1316: NO), listener object 1212 returns an invalid status indication to speaker object 514 (step 1118). If key server 234 returns a UID and access profile and the network access request received from speaker object 514 is permitted by the access profile (step 1316: YES), listener object 1212 performs the network access request (step 1320). In addition to the check against the access profile received from key server 234, applications requiring extra fine grained access control may use the UID received from key server 234 in combination with a local data base of access rules (not shown) to implement additional access control policies.

The request may include one or more requests for operations by resources on network 138. Performing the request may, for example, include a read operation on DB 134. After performing the request, listener object 1212 returns the requested data (if any) and status of the request to speaker object 514 (step 1322).

Figure 14:
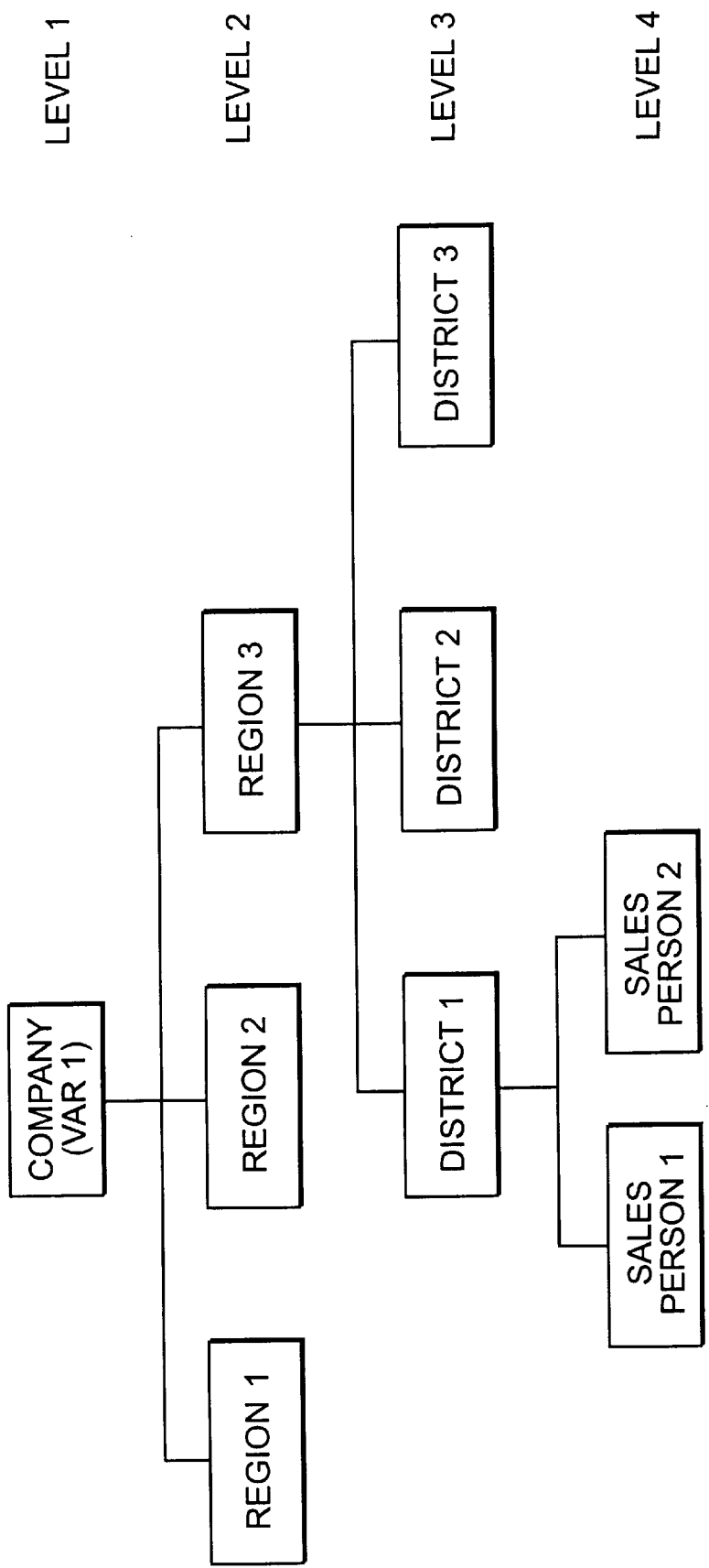
FIG. 14 is a block diagram showing a file security structure that only allows access to particular levels of information.

FIG. 14 is a block diagram showing a file security structure that may be used to limit user access to particular levels of information. FIG. 14, for example, may represent the data structure of DB 134. A user associated with a particular UID, PWD, or session key be restricted to only accessing particular levels of data. For example, a particular UID may only allow access to level three and level four information of FIG. 12. The level access information is included in the user profile used by login process 512 to create the network access page presented to the user at client browser 110, as discussed above. This allows trusted network 138 to have varying degrees of protection depending on the particular user at client browser 110. The user profile may also define a variety of other types of acceptable operations for a user. The profile may define, for example, which resource(s) the user can use, and the operations that can be performed for the user by the resource.

Conclusion

It will be apparent to those skilled in the art that various modifications and variations can be made in the network access apparatus and methods consistent with the principles of the present invention without departing from the scope or spirit of the invention. Although a preferred embodiment has been described above, other variations are possible within the spirit and scope consistent with the principles of the present invention.

For example, speaker object 512 could be located in the client browser 110 by using Java applets to implement the speaker object on client browser 110. The user profile stored with the authentication information in authentication database 224 may include access levels corresponding to each particular user. For example, with respect to FIG. 12, the user having access to levels 3 and 4 will have a user profile indicating that the user can only be presented with URL selections allowing access to levels 3 and 4. Therefore, when the user profile is sent to login process 512, login process 512 creates a user access web page that only allows request to levels 3 and 4.

Other embodiments of the invention will be apparent to those skilled in the art from consideration of the specification and practice of the disclosed embodiments. The specification and examples are exemplary only, and the true scope and spirit of the invention is defined by the following claims and their equivalents.

We claim:

1. A system for performing a request, comprising:
   means for storing key information based on authentication of requestor identification information, wherein the key information includes a key and key expiration criteria;
   means for processing an original URL request and key from a requester to form a network request, said key stored at a client browser using a cookie;
   means for transferring the network request to a trusted network;
   means for processing the network request to extract the key and original URL request if the request was processed by the means for processing a request and key; and
   means for performing the original URL request if the key and key expiration criteria are valid.

2. The system according the claim 1, wherein the means for processing comprises:
   means for including in the network request information identifying the means for transferring.

3. The system according to claim 1, wherein the means for processing comprises:
   means for signing information to form the network request.

4. The system according to claim 1, further comprising:
   means for storing key information based on authentication of requester identification information; and
   means for determining validity of the key based on the key information.

5. The system according to claim 1, wherein the means for performing the original URL request comprises:
   means for accessing a trusted network resource to perform the original URL request.

6. A method for performing a request, comprising:
   storing key information based on authentication of requester identification information, wherein the key information includes a key and key expiration criteria;
   forwarding said key to said requester using a cookie;
   processing an original URL request and key from the requester to form a network request;
   transferring the network request to a trusted network;
   processing the network request to extract the key and original URL request if the request was processed in the step of processing an original URL request and key; and
   performing the original URL request if the key and key expiration criteria are valid.

7. The method according the claim 6, wherein the step of processing an original URL request and key includes the substep of:
   including intermediate transferor information in the network request.

8. The method according to claim 6, wherein the step of processing an original URL request and key includes the substep of:
   signing information to form the network request.

9. The method according to claim 6, further including the steps of:
   storing key information based on authentication of requester identification information; and
   determining validity of the key based on the key information.

10. The method according to claim 6, wherein the step of performing the original URL request comprises:
    accessing a trusted network resource to perform the original URL request.

11. A computer program product comprising:
    a computer usable medium having computer readable code embodied therein for performing a request, the computer usable medium comprising:
    a key information storage module configured to store key information based on authentication of requestor identification information, wherein the key information includes a key and key expiration criteria;
    a first transferring module configured to transfer a cookie containing said key to a requester;
    a processing module configured to process an original URL request and key from the requester to form a network request;
    a second transferring module configured to transfer the network request to a trusted network;
    a processing module configured to process the network request to extract the key and original URL request if the request was processed by the means for processing a request and key; and
    a performing module configured to perform the original URL request if the key and key expiration criteria are valid.

12. The computer program product of claim 11, wherein the processing module configured to process an original URL request and key comprises:
    an including module configured to include in the network request information identifying the means for transferring.

13. The computer program product of claim 11, wherein the processing module configured to process an original URL request and key comprises:
    a signing module for signing information to form the network request.

14. The computer program product of claim 11, further comprising:
    a storing module configured to store key information based on authentication of requester identification information; and
    a determining module configured to determine validity of the key based on the key information.

15. The computer program product of claim 11, wherein the performing module comprises:
    an accessing module configured to access a trusted network resource to perform the original URL request.

16. A system for providing access to a resource, comprising:
    means for storing key information based on authentication of requestor identification information, wherein the key information includes a key and key expiration criteria;
    a cookie containing the key, said cookie forwarded to a requestor;
    means for receiving an original URL request and the key from the requester;
    means for processing the original URL request and the key from the requester to form a network request;
    means for transferring the network request to a trusted network;
    means for processing the network request to extract the key if the network request was processed by the means for processing the original URL request and the key; and means for performing the original URL request if the key and key expiration criteria are valid.

17. The system according to claim 16, further comprising:
means for authenticating requester identification information; and
means for creating the key in response to authentication of requester identification information.

18. The system according to claim 16, further comprising:
means for authenticating requester information; and
means for forwarding requester access profile information based on the authentication.

19. The system according to claim 16, further comprising:
means for receiving user access profile information;
means for creating display information having user access options based on the user access profile information; and
means for forwarding the display information to the requester.

20. The system according the claim 16, further comprising:
means for consulting the means for storing a key to determine validity of the extracted key.

21. The system according to claim 16,
wherein the means for processing the original URL request and the key comprises means for including information identifying the means for transferring; and
wherein the means for processing the network request comprises means for determining if the information identifying the means for transferring matches predetermined criteria.

22. The system according to claim 16
wherein the means for processing the original URL request and the key comprises means for signing first information to form the network request; and
wherein the means for processing the network request comprises means for verifying the network request to derive the first information.

23. A method for providing access to a resource, comprising:
storing key information based on authentication of requestor identification information, wherein the key information includes a key and key expiration criteria;
forwarding a cookie to a requester, said cookie containing said key;
receiving an original URL request and the key from the requester;
processing the original URL request and the key from the requester to form a network request;
transferring the network request to a trusted network;
processing the network request to extract the key if the network request was processed by the step of processing the original URL request and the key; and
performing the original URL request if the key and key expiration criteria are valid.

24. The method according to claim 23, further including the steps of:
authenticating requester identification information; and
creating the key in response to authentication of requester identification information.

25. The method according to claim 23, further including the steps of:
authenticating requester information; and
forwarding requester access profile information based on the authentication.

26. The method according to claim 23, further including the steps of:
receiving user access profile information;
creating display information having user access options based on the user access profile information; and
forwarding the display information to the requester.

27. The method according the claim 23, further including the step of:
determining validity of the extracted key.

28. The method according to claim 23,
wherein the step of processing the original URL request and the key includes a substep of including information identifying a means for transferring the network request; and
wherein the step of processing the network request includes a substep of determining if the information identifying a means for transferring matches predetermined criteria.

29. The method according to claim 23,
wherein the step of processing the original URL request and the key includes a substep of signing first information to form the network request; and
wherein the step of processing the network request includes a substep of verifying the network request to derive the first information.

30. A computer program product comprising:
a computer usable medium having computer readable code embodied therein for providing access to a resource, the computer usable medium comprising:
a storing module configured to store key information based on authentication of requestor identification information, wherein the key information includes a key and key expiration criteria;
a forwarding module configured to forward a cookie to the requester, said cookie containing said key;
a receiving module configured to receive an original URL request and the key from the requester;
a processing module configured to process the original URL request and the key from the requester to form a network request;
a transferring module configured to transfer the network request to a trusted network;
a processing module configured to process the network request to extract the key if the network request was processed by the step of processing the original URL request and the key; and
a performing module configured to perform the original URL request if the key and key expiration criteria are valid.

31. The computer program product of claim 30, further comprising:
an authenticating module configured to authenticate requester identification information; and
a creating module configured to create the key in response to authentication of requester identification information.

32. The computer program product according to claim 30, further comprising:
an authenticating module configured to authenticate requester information; and
a forwarding module configured to forward requester access profile information based on the authentication.

33. The computer program product of claim 30, further comprising:
a receiving module configured to receive user access profile information;

a creating module configured to display information having user access options based on the user access profile information; and a forwarding module configured to forward the display information to the requester.

34. The computer program product of claim 30, further comprising:

a consulting module configured to consult the storing module configured to store a key to determine validity of the extracted key.

35. The computer program product of claim 30, wherein the processing module configured to process the original URL request and the key comprises an including module configured to include information in the network request identifying the transferring module; and wherein the processing module configured to process the network request comprises a determining module configured to determine if the information identifying a means for transferring matches predetermined criteria.

36. The computer program product according to claim 30, wherein the processing module configured to process the original URL request and the key comprises an encryption module configured to sign first information to form the network request; and wherein the processing module configured to process the network request comprises a decryption module configured to verify the network request to derive the first information.

* * * * *